3,485,572
INSOLUBLE CARBOXY CONTAINING
DYESTUFF COMPOSITIONS
Carl Taube and Karl-Heinz Freytag, Leverkusen, Germany, assignors to Farbenfabriken Bayer Aktiengesellschaft, Leverkusen, Germany, a corporation of Germany
No Drawing. Filed July 1, 1966, Ser. No. 562,087
Claims priority, application Germany, July 9, 1965,
F 46,563
Int. Cl. D06p 1/64
U.S. Cl. 8—62          5 Claims

ABSTRACT OF THE DISCLOSURE

A printing paste comprising a hardly soluble or insoluble carboxyl group containing dyestuff and a volatile amine or a mixture of a compound liberating a volatile amine and an alkaline agent in an amount sufficient to dissolve said dyestuff, said paste being adapted to be applied to a fully synthetic or semi-synthetic fiber, intermediately dried, and then heated to a temperatsre between 150° and 230° C., or steamed.

---

It is known to print hydrophobic fibre materials, especially aromatic polyesters, fibres of triacetate, 2½-acetate and polypropylene and also polymers and copolymers of acrylonitrile with dispersion dyestuffs, the last mentioned in bright shades. Although textile prints with excellent fastness properties can be achieved, this method has the disadvantage that the formation of the dyestuffs is frequently expensive in cost and labour. In principle, therefore, the use of aqueous dyestuff solutions for printing is preferred, as is customary for the dyeing of hydrophilic fibres, such as cotton, wool and the like. Within the range of the above-mentioned hydrophobic fibre materials, however, no methods have hitherto been generally adopted which take the advantageous use of aqueous dyestuff solutions into consideration. It is also known to dye or print fibre materials of a hydrophilic character with dyestuffs which contain carboxylic acid groups, or with their alkali metal salts, from an aqueous solution. However, this method yields useless results when applied to hydrophobic fibres. Dyestuffs which contain carboxyl groups could, therefore, only be applied to hydrophobic fibres in the form of dyestuff dispersions, and the aforesaid disadvantages arising in their production have to be accepted.

It has now been found that fully synthetic and semi-synthetic fibre materials, in particular those of aromatic polyesters, such as polyethylene terephthalates and polyesters of terephthalic acid and 1,4-bis-hydroxymethyl-cyclohexane, cellulose triacetate, polyvinyl chloride, synthetic superpolyamides and superpolyurethane, can be printed with dyestuffs insoluble or hardly soluble in water by known methods in a very simple manner and with excellent fastness properties, when a printing paste which contains a carboxyl group-containing dyestuff, a quantity of a volatile amine sufficient for dissolving this dyestuff, or of a compound setting free such an amine, and possibly further auxiliaries, is applied to the fibre materials, the printed material is subjected to intermediate drying and subsequently heated at temperatures of 150 to 230° C. (dry-fixing), or steamed with or without pressure. The prints obtained may finally be after-treated in the usual manner, for example washed and finished.

The printing pastes are applied to the fibre materials in the printing devices customary for this purpose. The printing paste can be prepared by introducing the carboxyl group-containing dyestuff, which should preferably be water-insoluble or hardly soluble in water, into the aqueous medium and stirring with a volatile amine, e.g. with ammonia or an hydroxyalkyl amine, and thus dissolving it. The quantity of volatile amine necessary for dissolving the dyestuff can easily be determined by experiments. It is obviously dependent upon the type of the dyestuff employed, i.e. the size of the molecule, the substitution and the number of free carboxylic groups of the dyestuff. In many cases it is advantageous to use an excess of the volatile amine. When compounds are used which, under the conditions of the reaction, liberate the required amount of a volatile amine, ammonium salts being primarily suitable, the concurrent use of alkaline agents, such as alkali metal carbonates or bicarbonates, is of advantage.

Especially suitable volatile amines are ammonia and aliphatic amines, such as methylamine, dimethylamine, trimethylamine, dimethyl-β-hydroxyethylamine, diethyl-β-hydroxyethylamine, di-β-hydroxyethylamine, diethylamine, triethylamine, alkylamine and tri-n-propylamine. Of the amines, ammonia is chiefly preferred. These amines can be used in the form of their bases or in the form of their salts with, for example, hydrochloric acid, nitric acid, tartaric acid or sulphuric acid. Suitable compounds which liberate volatile amines, especially ammonia, are for example ammonium chloride, sulphate, nitrate, thiocyanate and tartrate. Examples of the alkaline agents which can be used together with compounds of this type, are the following: sodium hydroxide solution, potassium hydroxide solution, sodium carbonate, sodium hydrogen carbonate, the corresponding potassium salts, trisodium phosphate etc.

The dissolving of the dyestuff which is present in the form of its free carboxylic acid and is preferably water-insoluble or hardly soluble in water, by means of the volatile amines or of compounds yielding such amines, is probably caused by a simple salt-formation. In many cases, the resulting ammonium salts of the carboxyl group-containing dyestuffs can be isolated; they are readily soluble or at least substantially more readily soluble in water than the basic dyestuffs which contain free carboxyl groups. It is, therefore, also possible to add the dyestuffs in the form of the ammonium salts to the printing paste, but also in this case a further addition of a volatile amine, e.g. ammonia, is expedient, to counteract the hydrolysis and thus reprecipitation of the dyestuffs containing free carboxyl groups.

If compounds yielding volatile amines are used, especially ammonium salts, in combination with alkaline agents, such as alkali metal carbonates, then an alkali metal salt of the carboxyl group-containing dyestuff is presumably first formed which is then converted, in the presence of ammonium salts, into the free carboxylic acid which, in turn then dyes the fibre. This assumption is, however, not proven by experiment.

The printed fabric is treated at temperatures of between 150 to 230° C. (thermosol process), preferably with dry heat for a period of 2 to 300 seconds, in devices suitable for this purpose.

When the dyestuff, however, is fixed by treatment with steam, the known steaming apparatus are employed.

The new process can be based on any types of dyestuff, provided that these contain at least one carboxylic acid group; those carboxyl group-containing dyestuffs are preferably used which in the form of the free acids are hardly soluble or insoluble in water. The dyestuffs to be used according to the present process may belong, for example, to the series of the metal-containing or metal-free mono- or polyazo dyestuffs or (azo)methine dyestuffs, the azoporphin dyestuffs, in particular to the copper or nickel phthalocyanine series, the series of anthraquinone dyestuffs and also condensation products of the latter which contain more than three fused rings; further suitable dyestuffs are oxazine, nitro, diphenylamine, naphthalic acid, di- and triphenylmethane dyestuffs, naphtholactam condensation dyestuffs and dyestuffs based on naphthoquinone and naphthoquinonimine and other condensation dyestuffs. The dyestuffs may contain, besides the carboxylic acid group or groups, required by definition, further customary substituents, such as halogen, alkyl, cycloalkyl, aralkyl, aryl, alkoxy, aryloxy, nitro, sulphone, possibly substituted sulphonamide groups, possibly substituted or acylated amino groups, alkylthio and arylthio, hydroxy, hydroxy-alkyloxy, aminoalkyloxy, cyano, cyanoalkyl radicals as well as alkyl, aryl or aralkyl radicals which are substituted in a different manner, and the like.

The dyestuffs contain one or several carboxylic acid groups which are linked to aromatic nuclei of the basic dyestuff structure itself or to externally positioned aryl aralkyl or aliphatic groupings. The number of carboxyl groups is in general 1 to 8, but preferably 1 to 4.

A great number of carboxyl group-containing dyestuffs are known and produced in the usual manner, i.e. by converting corresponding dyestuff intermediate products, which contain one or several carboxyl groups attached to the nucleus or in an external position, while preserving the carboxyl groups, into the desired end products which are optionally subjected to further conversion reactions. In the case of azo dyestuffs, the usual conversion reactions are diazotisation, coupling and also condensation, in the case of most other dyestuff classes they are condensation reactions. Examples of suitable carboxyl group-containing azo dyestuffs, are the following compounds:

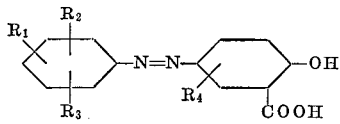

$R_1$, $R_2$, $R_3$=H, $CH_3$, $C_2H_5$, $OCH_3$, $OC_2H_5$, Cl, Br, $OCH_2COOR$, $NO_2$, COOH, $OCH_2COOH$, COOR (R=alkyl); $R_4$=alkyl

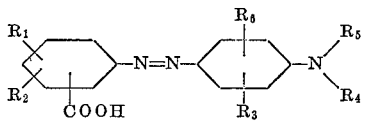

$R_1$, $R_2$=H, $CH_3$, Cl, Br, $NO_2$, $OCH_3$; $R_3$, $R_6$=H, $CH_3$, $OCH_3$, $OC_2H_5$; $R_4$, $R_5$=H, $CH_3$, $C_2H_5$, $CH_2CH_2OH$, $CH_2CH_2OR_7$ ($R_7$=acyl radical)

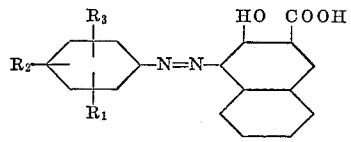

$R_1$, $R_2$, $R_3$=H, $CH_3$, $C_2H_5$, $OCH_3$, $OC_2H_5$, Cl, Br, $NO_2$, COOH

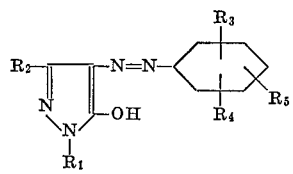

$R_1$=$C_2H_5$, $CH_2CH_2OH$, $C_6H_5$, $C_6H_4Cl$, $C_6H_4COOH$; $R_2$=$CH_3$, COOH; $R_3$, $R_4$, $R_5$=H, $CH_3$, $C_2H_5$, $OCH_3$, $OC_2H_5$, $OCH_2COOH$, COOH, COOR, $OCH_2COOR$, $NO_2$, Cl, Br, CN (R=alkyl)

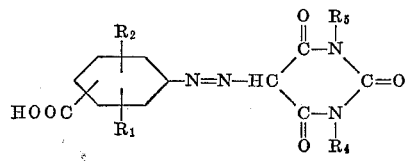

$R_1$, $R_2$=H, $CH_3$, $C_2H_5$, $OCH_3$, $OC_2H_5$, $NO_2$, Cl, Br; $R_4$, $R_5$=$CH_3$, $C_2H_5$, $CH_2CH_2OH$

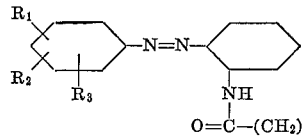

$R_1$, $R_2$, $R_3$=H, $CH_3$, $C_2H_5$, $OCH_3$, $OC_2H_5$, $OCH_2COOH$, COOH, $OCH_2COOR$, COOR, $NO_2$, Cl, Br, CN; $R_4$, $R_5$=$CH_3$, $C_2H_5$, $CH_2CH_2OH$, $CH_2CH_2OR$ (R=alkyl) n=0, 1, 2, 3

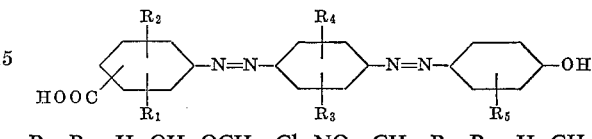

$R_1$, $R_2$=H, OH, $OCH_3$, Cl, $NO_2$, $CH_3$; $R_3$, $R_4$=H, $CH_3$, $C_2H_5$, $OCH_3$, $OC_2H_5$; $R_5$=H, $CH_3$, $OCH_3$, COOH

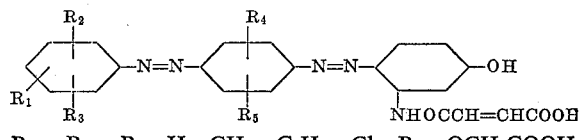

$R_1$, $R_2$, $R_3$=H, $CH_3$, $C_2H_5$, Cl, Br, $OCH_2COOH$, $OCH_3COOR$, COOH (R=alkyl); $R_4$, $R_5$=H, $CH_3$, $C_2H_5$, $OCH_3$, $OC_2H_5$; n=0, 1, 2

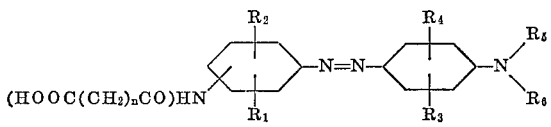

$R_1$, $R_2$, $R_3$=H, $CH_3$, $C_2H_5$, Cl, Br, $OCH_2COOH$, $OCH_3COOR$, COOH (R=alkyl); $R_4$, $R_5$=H, $CH_3$, $C_2H_5$, $OCH_3$, $OC_2H_5$

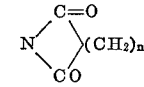

$R_1$, $R_2$=H, $CH_3$, Cl, Br, $NO_2$, $OCH_3$; $R_3$, $R_4$=H, $CH_3$, $OCH_3$, $OC_2H_5$, $NHCO(CH_2)_nCOOH$, NHCOCH=CHCOOH,

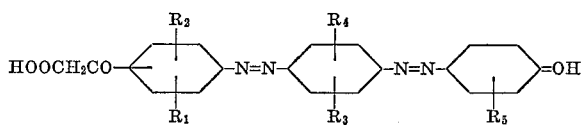

$R_5$, $R_6$=H, $CH_3$, $C_2H_5$, $CH_2CH_2OH$, $CH_2CH_2OR_7$ ($R_7$=aryl radical); n=0, 1, 2, 3

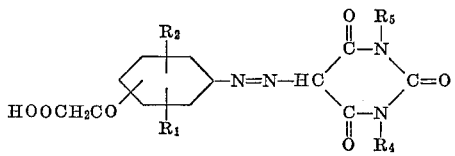

$R_1$, $R_2$, $R_3$, $R_4$, $R_5$=H, $CH_3$, $C_2H_5$, $OCH_3$ $R_1$, $R_2$=H, $CH_3$, $C_2H_5$, $OCH_3$, $OC_2H_5$, $NO_2$, Cl, Br; $R_4$, $R_5$=$CH_3$, $C_2H_5$, $CH_2CH_2OH$

For the synthesis of these azo dyestuffs and other types, the following diazo components can be used, for example: 1-amino-4-methyl - benzene, 1-amino-4-chlorobenzene, 1- amino-4-bromobenzene, 1-amino-4-nitrobenzene, 1 - amino-4-cyanobenzene, 1 - amino-4-methylsulphonylbenzene, 4-amino-benzoic acid methyl ester, 1-amino-2,4-dichlorobenzene, 1 - amino-2-methyl-4-chlorobenzene, 1-amino-2-trifluoromethyl-4-chlorobenzene, 1-amino-2-cyano-4-chlorobenzene, 1 - amino-2-chloro-4-cyanobenzene, 1 - amino-2-chloro - 4 - nitrobenzene, 1-amino-4-chloro-2-methylsulphonylbenzene, 1 - amino-2-chloro-4-methylsulphonylbenzene, 1-amino-2,4-dicyanobenzene, 1-amino - 2 - cyano-4-methylsulphonylbenzene, 1 - amino - 4-cyano-2-methylsulphonylbenzene, 1-amino-2,4-bis-(methylsulphonyl) - benzene, 1-amino-2,6-dichloro-4-nitrobenzene, 1 - amino-2,6-dibromo-4-methylsulphonylbenzene, 1-amino-2-methyl-4-nitrobenzene, 1 - amino-2-trifluoromethyl-4-nitrobenzene, 1-amino - 2 - chloro-4-nitrobenzene, 1-amino-2-cyano-4-nitrobenzene, 1-amino - 2 - methylsulphonyl-4-nitrobenzene, 1-amino - 2,4 - dinitrobenzene, 1-amino-2,4-dinitro-6-chlorobenzene, 1-amino - 2,4 - dinitro-6-bromobenzene, 1-amino - 2,4 - dinitro-6-cyanobenzene, 1-amino-4-acetylaminobenzene, 2-amino - 6 - cyanobenzthiazole-1,3,1-amino - 4 - methylsulphonyl-hydroxy-ethylsulphonyl - methylbenzene, 1-amino - 2,6 - dichloro, 4-cyanobenzene, 1-amino-2-cyano - 6-bromobenzene, 1-amino-2-bromo-4-acetobenzene, 2-amino - 5 - nitrothiazole and also the derivatives substituted in the 4-position by ethyl, cyano-, trifluoromethyl, phenyl or substituted phenyl, 1-amino-2-nitro-4-acetobenzene, 2-aminothiophen, 5 - aminobenzothiadiazole - 1,2,3, 5 - aminothiadiazole-1,2,4, 5 - aminobenzothiazole-1,3, 5 - aminobenzotriazole-1,2,3, 5 - amino-3-benzyl-mercapto - thiadiazole - 1,2,4, 2-aminothiazole, 2-amino - 4 - phenylthiadiazole-1,3,5 as well as their derivatives substituted in the phenyl nucleus by nonionic radicals, aminoazo-benzene, aminoazo-toluene, 1-acetylamino-3-aminobenzene, 1-aminobenzene - 2 - carboxylic acid, 1-amino-benzene - 3 - carboxylic acid, 1-aminobenzene-4-carboxylic acid, 1-amino-4-nitrobenzene-2-carboxylic acid, 1-amino-3-chlorobenzene-4-carboxylic acid, 1-amino - 2 - chlorobenzene-4-carboxylic acid, 1-amino-4-phenoxyacetic acid, 1-amino - 3 - phenoxyacetic acid, 1-amino-3-chloro - 4 - phenoxyacetic acid, 1-amino-4-hydroxybenzene-3-carboxylic acid or 5-amino-1,2,4-triazole-3-carboxylic acid.

Coupling components suitable for the synthesis of the azo dyestuffs to be used according to the present process are, for example, those of the benzene, naphthalene, pyrazolone, acylacetic acid amide, aminopyrazole and hydroxy- or aminoquinoline series. Of the great number of usable components the following may be mentioned, by way of example: 1-phenyl-3-methyl-5-pyrazolone and the derivatives substituted in the phenyl nucleus, 1-phenyl-5-pyrazolone-3-carboxylic acid and its esters, especially the esters with lower aliphatic alcohols, as well as the derivatives further substituted in the phenyl nucleus, e.g. 3'-4'-carboxyphenyl compounds, aceto-acetic acid alkyl, aralkyl and aryl amides as well as the derivatives further substituted at the aralkyl and aryl radicals, for example by —CCOH groups, α- and β-naphthylamine and the derivatives further substituted in the naphthyl nucleus, for example by —COOH, α- and β-naphthol and the derivatives further substituted in the aryl nucleus, such as particularly 3,4-hydroxy-naphthoic acid and its nuclear substitution products, 8-hydroxyquinoline, aniline derivative, such as alkyl-, aralkyl- and/or aryl-substituted anilines or their nuclear substitution products, e.g. 1-N,N-dimethylamino-3-aminobenzene, 1-N,N-diethylamino-3-aminobenzene, 1-N,N-di-β-cyanoethylamino-3-aminobenzene, 1-N,N-di-β-hydroxyethylamino-3-aminobenzene, 1-N,N-di-β-hydroxyethylamino-2-methoxy- or 2-ethoxy-5-aminobenzene, 1-N-methyl-N-ethylamino-3-aminobenzene, 1-N-β-cyanoethyl-N - β-hydroxyethyl-amino-3-aminobenzene, 1-N-β-cyanoethyl-N-methyl- or -N-ethylamino-3-aminobenzene, 1-N-ethyl - N-β,γ-dihydroxypropylamino-2-methoxy-5-aminobenzene, 1 - N,N-di-β-hydroxypropylamino-3-aminobenzene, 1 - N - β-cyano-β-(trifluoromethyl)-ethylamino-3-aminobenzene, 1 - N - β - hydroxy - β - (trifluoromethyl)- ethylamino-3-aminobenzene, 1-amino-2,5-dimethoxybenzene, 1 - amino - 2 - methyl - 5 - methoxybenzene, 1-amino - 2,5 - dimethylbenzene, 1 - aminobenzene, 1-amino - 2-methoxybenzene-1-amino-2-methylbenzene, 1-amino-3-methoxybenzene, 1-amino-3-methylbenzene, furthermore the coupling components of the formula

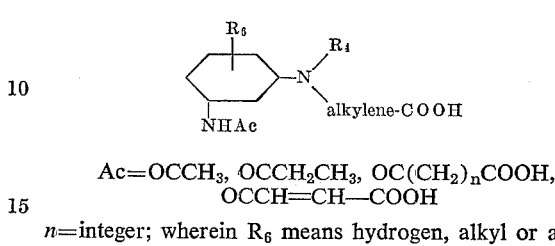

Ac=OCCH$_3$, OCCH$_2$CH$_3$, OC(CH$_2$)$_n$COOH, OCCH=CH—COOH $n$=integer; wherein R$_6$ means hydrogen, alkyl or alkoxy and R$_4$ represents hydrogen or a substituent, such as 1-(N-methyl- or -ethyl- or -propyl- or -isopropyl-N-β-carboxy-, -carboethoxy-ethyl)-amino-3-aminobenzene and the derivatives further substituted in the 6-position by methyl or methoxy, 1-N,N-di-(β-carboxyethyl)-amino-3-aminobenzene and also the derivatives further substituted in the 6-position by methyl, methoxy or ethoxy, 1-(N-β-cyanoethyl- or -β - chloroethyl - N-β-carboxyethyl)-amino-3-aminobenzene as well as the derivatives further substituted in the 6-position by methyl or methoxy, moreover 1-(N-β-methoxy- or -ethoxy- or -propoxy-carbonyl-hydroxyethyl)-amino-3-aminobenzene and the derivatives further substituted in the 6-position by methyl or methoxy, 1-N,N-di-(β-methoxy- or -ethoxy- or -propoxy-carbonyl-hydroxyethyl)-amino-3-aminobenzene and the derivatives further substituted in the 6-position by methyl or methoxy, 1-(N-β-cyanoethyl- or -β-chloroethyl-N-β-methoxy- or -ethoxy-carbonyl-hydroxyethyl)-amino-3-aminobenzene and the derivatives further substituted in the 6-position by methyl or methoxy.

Carboxyl group-containing azo dyestuffs of these constitutions and also those of a different structure, as well as carboxyl group-containing anthraquinone dyestuffs and condensation products of the latter, and carboxyl group-containing dyestuffs of other classes have been described in numerous patent specifications. Reference may be made, by way of example, to the following patents: German patent specifications Nos. 261,885, 433,848, 455,823, 502,554, 638,835, 654,615, 677,860, 695,033, 1,048,374, 1,117,233, German published patent specifications Nos. 1,049,821, 1,143,481 and 1,156,525, Swiss patent specification No. 154,707, British patent specification No. 794,177, French patent specifications Nos. 791,119, 847,706, 1,213,082, 1,255,348 and 1,262,441 and U.S. patent specifications Nos. 2,195,974, 2,051,004 and 2,921,945.

Suitable anthraquinone dyestuffs are, for example, those in which one carboxyl group or several carboxyl groups stand in the anthraquinone molecule itself or in aryl or alkyl radicals which are linked to the anthraquinone molecule via bridge members, such as amino, ether, thioether, sulphonamide or sulphonyl amino groups. The anthraquinone compounds may possess, for example, the constitution shown in the following table:

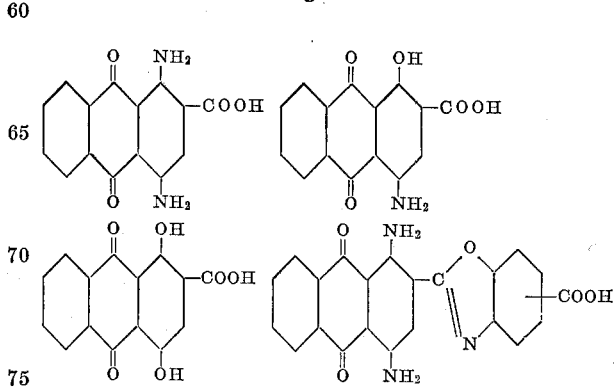

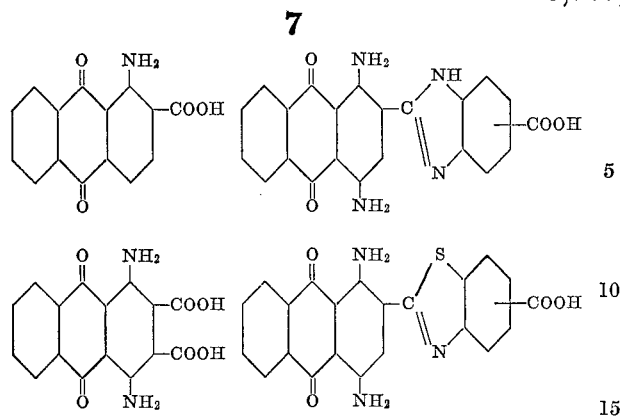
Acylation products of aminoanthraquinones with
(a) 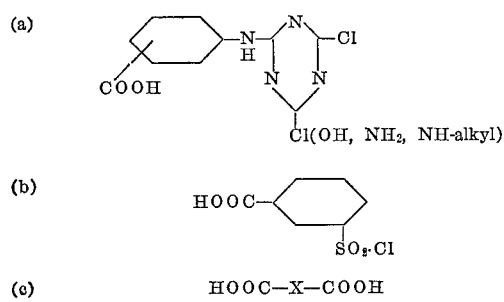
(b) [structure shown]
(c) HOOC—X—COOH
X=aryl, alkyl, heterocycl.
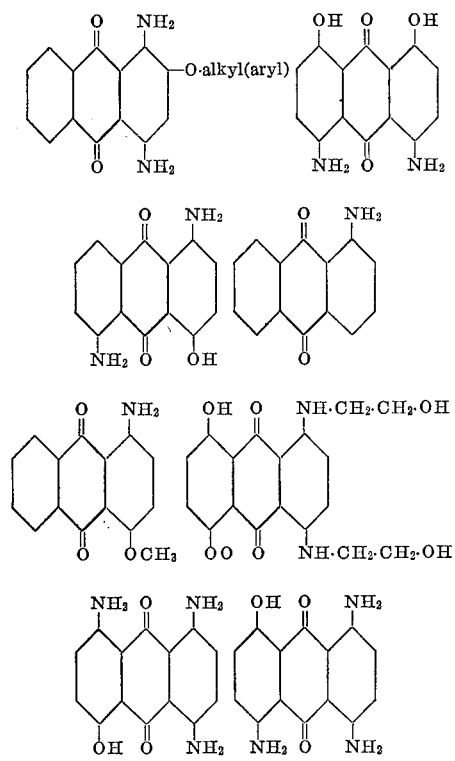
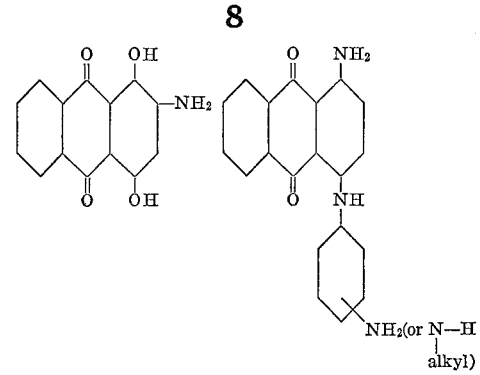
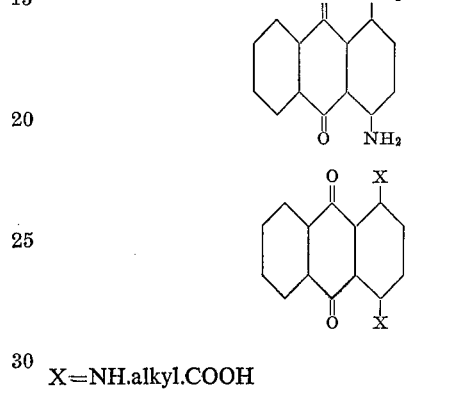
X=NH.alkyl.COOH
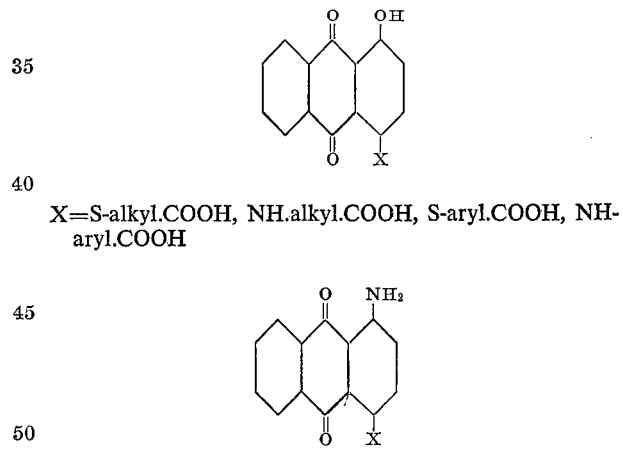
X=S-alkyl.COOH, NH.alkyl.COOH, S-aryl.COOH, NH-aryl.COOH
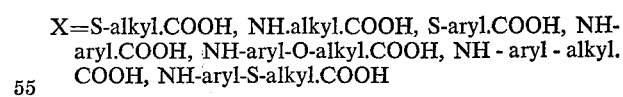
X=S-alkyl.COOH, NH.alkyl.COOH, S-aryl.COOH, NH-aryl.COOH, NH-aryl-O-alkyl.COOH, NH-aryl-alkyl.COOH, NH-aryl-S-alkyl.COOH
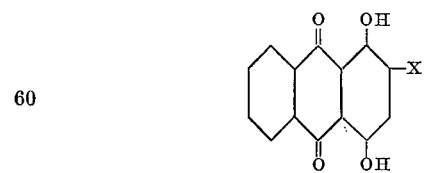
X=-alkyl.COOH, O-alkyl.COOH, S-alkyl.COOH, NH.alkyl.COOH, O-aryl.COOH
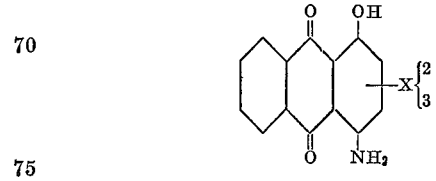

X=O-alkyl.COOH, S-alkyl.COOH; X=S-alkyl.COOH

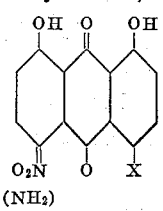

X=S-aryl.COOH, NH.alkyl.COOH; S-alkyl.COOH

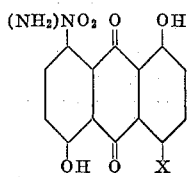

X=S-alkyl.COOH, NH.alkyl.COOH, S-aryl.COOH

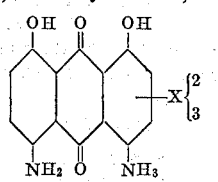

X=S-alkyl.COOH, O-aryl.COOH, S-aryl.COOH; X=S-alkyl.COOH, O-aryl.COOH

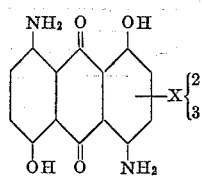

X=S-alkyl.COOH, O-aryl.COOH, S-aryl.COOH; X=S-alkyl.COOH, O-aryl.COOH, S-aryl.COOH Of the carboxyl group-containing anthraquinone condensation products with more than three fused rings, the following may be mentioned, for example:

isothiazole anthrones, such as

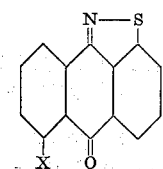

X=S-alkyl-COOH, NH-alkyl-COOH, S-aryl-COOH, NH-aryl-COOH

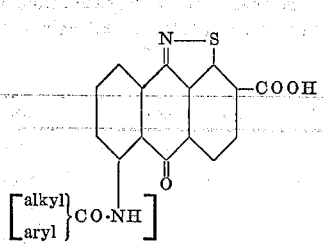

pyrazole anthrones, such as

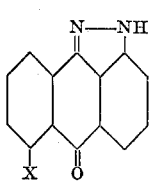

X=S-alkyl-COOH, NH-alkyl-COOH, S-aryl-COOH, NH-aryl-COOH

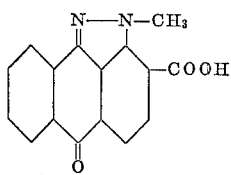

furthermore the dyestuffs of the type

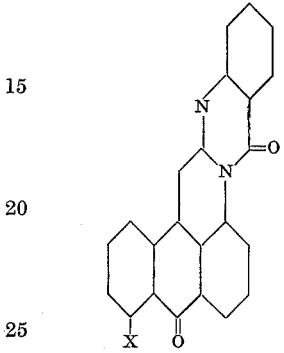 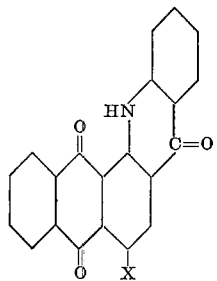

X=S-alkyl-COOH, NH-alkyl-COOH, S-aryl-COOH, NH-aryl-COOH,

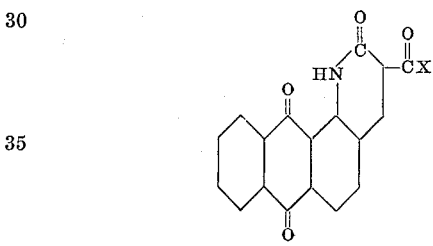

X=NH-alkyl-COOH, O-aryl-COOH, NH-aryl-COOH,

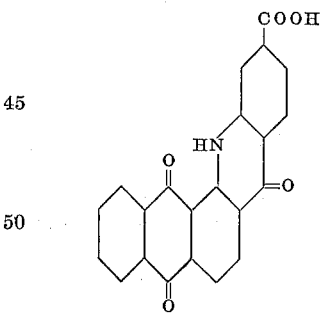 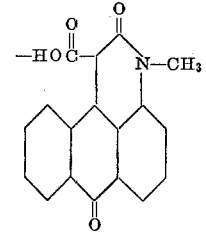

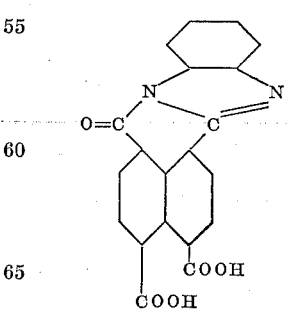 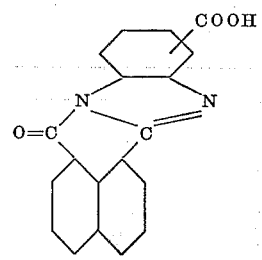

Anthraquinone dyestuffs of the above formulae are prepared by the fundamental methods of synthesis known in anthraquinone chemistry. For this purpose, condensation reactions with appropriate starting products are primarily to be considered. It is thus possible, for example, to condense amino group-containing anthraquinone compounds, in which the amino groups are standing either in an external position, but preferably in a nuclear-linked position, with appropriate carboxyaryl acid halides or anhydrides, e.g. carboxyphenyl or carboxynaphthyl-sulphonic acid or carboxylic acid chlorides or bromides, to give the corresponding acid amides, or to react, for example, anthraquinone compounds with labile halogen atoms, such as 1-amino- or 1-substituted amino-4-bromo anthraquinone - 2 - sulphonic acids, with carboxyaryl-amines, such as carboxyphenyl or carboxynaphthyl amines to give the corresponding carboxyaryl - amino-anthraquinone derivatives. By similar methods of synthesis, anthraquinone ether and thioether derivatives can be produced, in which carboxy groups are contained in alkyl, aralkyl or aryl radicals of the ether of thioether component. A further possible synthesis of the carboxyl group-containing anthraquinone dyestuffs to be used according to the present process consists in converting anthraquinone acid halides, such as carboxylic acid and sulphonic acid chlorides or bromides into the corresponding amides or esters with appropriate amino or hydroxy compounds, containing at least one additional carboxylic acid groups. It is self-evident that those anthraquinone compounds in which one or several carboxyl groups are attached to the nucleus, or in which nuclear as well as externally linked carboxyl groups are present, can be employed for the present process.

Suitable carboxyl group-containing azaporphin dyestuffs are built up for example by condensing metal phthalocyanine sulphonic acid halides, especially copper- and nickel-Pc-sulphonic acid halides, or of chloromethyl-substituted phthalocyanine dyestuffs with aminoaryl carboxylic acids, amino-aralkyl carboxylic acids or amino-alkyl carboxylic acids.

Carboxyl group-containing diarylamine dyestuffs are also produced by the condensation of suitable starting compounds, such as carboxyarylamines.

As has already been mentioned, the printing paste may also contain, besides dyestuff and volatile amine, or a compound yielding such an amine, in combination with alkaline agents, further auxiliaries, if necessary such as sodium salts of highly condensed naphthalene-sulphonic acid/formaldehyde resins, sulphite cellulose waste liquor products, condensation products of higher alcohols with ethylene oxide, polyglycol ethers of fatty acid amides and alkylphenols, sulphosuccinic acid esters or Turkey red oil.

Fully synthetic and semi-synthetic fibre materials of the greatest variety can be printed by the method according to the present process. The process is of particular interest for printing fabrics of aromatic polyester fibres, especially of polyethylene terephthalates and polyesters of terephthalic acid and 1,4-bis-hydroxymethyl-cyclohexane, and of cellulose triacetate. The results achieved on these materials are especially satisfactory. The prints obtained are characterised by good general fastness properties and are distinguished, in comparison with prints produced by the dispersion printing method with the carboxyl group-containing dyestuffs in the form of the free acid or its sodium salts, by a better uniformity and a superior fastness to sublimation and rubbing.

The following examples are given for the purpose of illustrating the invention.

Example 1

A printing paste is prepared from the following components:

| | Parts by weight |
|---|---|
| Monoazo dyestuff 4-nitro-2-chloro-1-aminobenzene →N,N-di-β-carboxyethyl-aminobenzene | 20 |
| Diethylene glycol | 30 |
| Sodium carbonate | 20 |
| Ammonium chloride | 400 |
| Water | 490 |
| | 1,000 |

A fabric of polyethylene terephthalate is printed with this printing paste in the usual manner on a screen printing or roller printing machine and steamed for 30 minutes at an excess pressure of 1.5 atmospheres. A red print of excellent fastness to wet processing and sublimation is obtained.

Example 2

A triacetate fabric is printed in the usual manner with a printing paste of the following components

| | Parts by weight |
|---|---|
| Monoazo dyestuff | 20 |

(HOOC-CH$_2$-CH$_2$)$_2$-NOC-⟨⟩-N=N-C——C-COOCH$_3$
                                  ‖    ‖
                              HO-C    N
                                   \\N/
                                    |
                                   ⟨⟩

| | |
|---|---|
| Sodium carbonate | 20 |
| Ammonium nitrate | 40 |
| Carob bean flour | 400 |
| Thiodiethylene glycol | 30 |
| Water | 490 |
| | 1,000 | and treated (fixed) at 200 to 220° C. for 40 seconds. A yellow print, fast to wet processing, sublimation and light, is obtained.

If in the process of the present example the dyestuffs set out in the following table are used and the respective azo dyestuffs are obtained by coupling a diazo component of Column 1 with a coupling component of Column 2, diazotisation and coupling with an azo component of the 3rd column optionally being repeated then valuable prints are also obtained on aromatic polyesters in the specified shades.

| Diazo component | 1st coupling component | 2nd coupling component | Shade |
|---|---|---|---|
| 1-amino-5-nitrobenzene-2-carboxylic acid | 1-phenyl-5-pyrazolone-3-carboxylic acid | | Yellow. |
| 1-amino-2-chloro-benzene-5-carboxylic acid | 2-hydroxynaphthalene-3-carboxylic acid | | Red. |
| 4-chloro-3-aminobenzoic acid | N,N-di-(β-hydroxyethyl)-3-methylaminobenzene | | Reddish yellow. |
| 5-chloro-2-aminobenzoic acid | N,N-di-(β-hydroxyethyl)-3-methylaminobenzene | | Red. |
| 4-chloro-3-aminobenzoic acid | N,N-di-(β-hydroxyethyl)-aminobenzene | | Reddish yellow. |
| 3-nitro-aminobenzene | N,N-di-(β-carboxymethyl)-aminobenzene | | Do. |
| 5-chloro-2-aminobenzoic acid | N,N-di-(β-hydroxyethyl)-aminobenzene | | Scarlet red. |
| 4-nitro-2-carboxy-1-aminobenzene | N,N-di-(β-hydroxyethyl)-3-methyl-1-aminobenzene | | Violet. |
| 4-nitro-2-carboxy-1-aminobenzene | 1-phenyl-5-pyrazolone-3-carboxylic acid | | Reddish yellow. |
| 4-nitro-2-carboxy-1-aminobenzene | N,N-di-(β-cyanoethyl)-aminobenzene | | Red. |

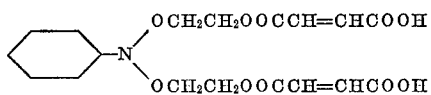

| | | | |
|---|---|---|---|
| 2-chloro-4-nitro-1-aminobenzene | (see structure above) | | Red. |
| 4-chloro-3-aminobenzoic acid | 1-(3'-carboxy)-phenyl-3-methyl-5-pyrazolone | | Yellow. |
| 4-aminobenzoic acid-methyl ester | do | | Do. |
| 4-aminobenzoic acid | do | | Do. |

| Diazo component | 1st coupling component | 2nd coupling component | Shade |
|---|---|---|---|
| 4-aminobenzoic acid-methyl ester | 1-(3'-carboxy-4'-chloro)-phenyl-3-methyl-5-pyrazolone | | Yellow. |
| 5-amino-1,2,4-triazole-3-carboxylic acid. | N,N-di-(β-cyanoethyl)-aminobenzene | | Do. |
| 3-aminobenzoic acid | 1-amino-2,5-dimethoxybenzene | 1-carboxy-2-hydroxybenzene | Brown. |
| 4-nitro-2-cyano-1-aminobenzene | N,N-di-(β-carboxyethyl)-2-ethoxy-5-acetamino-1-aminobenzene. | | Navy blue. |
| 2,4-dinitro-6-bromo-1-aminobenzene. | N,N-di-(β-carbhydroxyethyl)-2-ethoxy-5-acetamino-1-aminobenzene. | | Greenish blue. |
| 4-aminophenoxyacetic acid | 1-amino-3-methylbenzene | Hydroxybenzene | Yellowish orange. |
| 4-nitro-2-carboxy-1-aminobenzene | N,N-di-(β-hydroxyethyl)-aminobenzene | | Violet. |
| 1-amino-3-carboxy-4-hydroxy benzene. | Aminobenzene | N,N-di-β-hydroxyethyl-aminobenzene. | Red-brown. |
| 1-amino-4-phenoxyacetic acid | 1-amino-3-methylbenzene | 1-hydroxybenzene-2-carboxylic acid. | Orange. |
| 1-amino-2,4-di-nitrobenzene-6-carboxylic acid. | 3-methyl-N,N-di-β-hydroxyethylaminobenzene | | Reddish blue. |
| 1-amino-2-chlorobenzene-5-carboxylic acid. | 1-N,N-di-β-hydroxyethylamino-3-methylbenzene | | Reddish orange. |
| Aniline | 8-aminoquinoline-1-carboxylic acid | Hydroxybenzene | Brown. |

| Diazo component | Coupling component | Shade |
|---|---|---|
| 3-phenyl-5-aminothiadiazole-(1,2,4) | 1-dimethylamino-3-glutaraminobenzene | Red-brown. |
| 4-aminoazobenzenesalicylic acid | Dihydroxyethyl-m-toluidine | Do. |
| 2-amino-3,5-dinitrobenzoic acid | do | Blue-violet. |
| 4-aminobenzic acid | Phenyl-methyl-pyrazolone | Yellow. |
| 2-amino-5-nitrobenzonitrile | 3,3'-anilino-dipropionic acid | Red. |
| 2,4-dinitraniline | do | Red-brown. |
| 2-amino-5-nitrobenzoic acid | 1-diethylamino-3-acetaminobenzene | Violet. |
| 2-amino-5-nitrobenzonitrile | 1-methoxy-2-dihydroxyethyl-amino-4-glutaraminobenzene | Blue. |
| Do | Dihydroxyethylanilino-bis-glutaric acid semiester | Bluish red. |
| 3-aminobenzoic acid | Phenyl-methyl-pyrazolone | Yellow. |
| 3-amino-4-methoxybenzoic acid | do | Do. |
| 4-aminobenzoic acid | 3-aminophenyl-methyl-pyrazolone | Do. |
| 2-chloro-4-nitraniline | 3,3'-anilino-dipropionic acid | Red. |
| 2-amino-5-nitrobenzonitrile | 1-methoxy-2-amino-bis-propionic acid-4-methylbenzene | Violet. |
| 2-chloro-4-nitraniline | 3,3'-m-toluido-dipropionic acid | Red. |
| 2,6-dichloro-4-nitraniline | 3,3'-anilino-dipropionic acid | Brown-orange. |
| 4-aminobenzoic acid | p-Cresol | Reddish yellow. |
| 2-chloro-5-trifluoromethyl-aniline | 3,3'-anilino-dipropionic acid | Orange. |
| 2-chloro-5-trifluoromethylaniline | 3,3'-m-toluido-dipropionic acid | Do. |
| 2,6-dichloro-4-nitraniline | do | Red-brown. |
| 2,5-dichloro-4-nitraniline | do | Red. |
| 2-chloro-4-nitraniline | N-ethyl-anilino-3'-propionic acid | Red. |
| 2-amino-5-nitrobenzoic acid | do | Violet. |
| 2-amino-5-nitrobenzoic acid | N-cyanoethyl-N-propionic acid-aniline | Red. |
| 3-amino-1,2,4-triazole-5-carboxylic acid-azo-1-methyl-3-amino-4-methoxybenzene. | Dihydroxyethyl-m-toluidine | Bordeaux. |
| 3-amino-1,2,4-triazole-5-carboxylic acid-azo-amino-hydroquinonedimethylether. | do | Do. |
| 2-amino-5-nitro-benzoic acid | N-cyanoethyl-N-propionic acid-m-toluidine | Red violet. |
| 2-amino-5-nitro-benzonitrile | 1-ethoxy-2-amino-4-glutaraminobenzene | Violet. |
| 2-amino-5-nitro-phenoxyacetic acid | N-cyanoethyl-N-propionic acid-aniline | Red. |
| 2-chloro-4-nitraniline | 3-anilino-mono-propionic acid | Red. |
| 2-amino-5-nitro-benzonitrile | do | Red-brown. |
| 2-amino-4-chloro-benzonitrile | 3,3'-m-toluido-dipropionic acid | Orange. |
| 2-amino-5-nitrobenzonitrile | Dihydroxyethyl-anilino-bis-phthalic acid semiester | Violet. |
| 2-chloro-4-nitraniline | do | Red. |
| 2-chloro-4-nitraniline | Dihydroxyethyl-aniline-bis-glutaric acid semiester | Red-brown. |
| 2-chloro-4-nitraniline | Methyl-hydroxyethyl-anilino-glutaric acid semiester | Red. |
| 2-amino-4-chloro-benzonitrile | do | Orange. |
| 2-chloro-4-nitraniline | Methyl-hydroxyethylanilinosuccinic acid semiester | Red. |
| 2-amino-5-nitro-benzonitrile | 1-ethoxy-2-dihydroxyethylamino-4-acetaminobenzene-bis-glutaric acid semiester. | Blue. |
| 2,4-dinitro-6-bromo-aniline | 1-ethoxy-2-dihydroxyethylamino-4-acetaminobenzene-bis-glutaric acid semiester. | Blue. |
| 1-amino-benzene-4-N,N-bis-carboxyethyl-amide | 1-phenyl-3-carboethoxypyrazolone-5 | Yellow. |
| 6-carboxymethyl-sulfonyl-2-amino-benzothiazole | 1-N-ethyl-N-β-chloro-ethyl-amino-3-methyl-benzene | Red. |

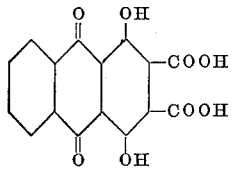

Red.

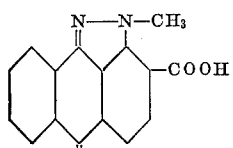

Greenish yellow.

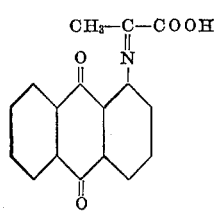

Yellowish brown.

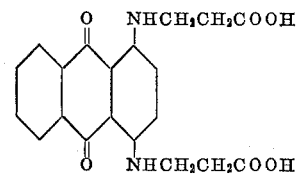

Dull blue

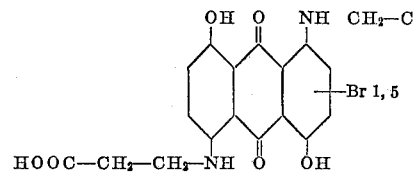

Blue.

Example 3

A polyethylene terephthalate fabric is printed in the usual manner with a printing paste of the following components:

| | Parts by weight |
|---|---|
| Monoazo dyestuff 2-amino-5-nitro-1-cyanobenzene → N,N-di-β-carboxyethyl-aminobenzene | 20 |
| Diethylene glycol | 30 |
| 30% ammonia | 20 |
| Ammonium chloride | 40 |
| Crystal gum thickening | 400 |
| Water | 490 |
| | 1,000 |

After steaming for 30 minutes a red print of excellent fastness to wet processing and sublimation is obtained.

Example 4

A triacetate fabric is printed in the usual manner with a printing paste of the following components:

| | Parts by weight |
|---|---|
| Dyestuff | 20 |

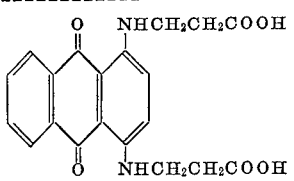

| | |
|---|---|
| 30% aqueous methylamine-solution | 20 |
| Ammonium tartrate | 40 |
| Carob bean flour | 400 |
| Thiodiethylene glycol | 30 |
| Water | 490 |
| | 1,000 |

After fixation for 40 seconds at 200–220° a print of excellent fastness to wet processing and sublimation is obtained.

We claim:

1. Process for printing fully synthetic or semi-synthetic fibre materials, characterized by applying to the fibre materials a printing paste, which contains a hardly soluble or insoluble carboxyl-group-containing dyestuff and a volatile amine in an amount sufficient to dissolve said carboxyl-group-containing dyestuff or a mixture of a compound liberating such a volatile amine and an alkaline agent in an amount sufficient to dissolve said carboxyl-group-containing dyestuff, and subjecting the printed material to an intermediate drying followed by heating at temperatures of between 150–230° C. or steaming.

2. Process according to claim 1 characterized in that the printing paste contains ammonia as the volatile amine.

3. Process according to claim 1 characterized in that the printing paste contains an ammonium salt and an alkaline agent.

4. Process according to claim 1 characterized in that the dyestuff is selected from the group consisting of metal containing monoazo dyestuffs, metal containing polyazo dyestuffs, metal-free monoazo dyestuffs, metal-free polyazo dyestuffs, azo methine dyestuffs, azoporphin dyestuffs, anthraquinone dyestuffs, oxazine dyestuffs, nitro dyestuffs, diphenylamine dyestuffs, naphthalic acid dyestuffs, diphenyl methane dyestuffs, triphenyl methane dyestuffs, and condensation dyestuffs, wherein the condensation dyestuffs are selected from condensation products of anthraquinone containing more than 3 fused rings, naphtholactam condensation dyestuffs, naphthoquinone dyestuffs, and naphthoquinonimine dyestuffs.

5. Process according to claim 4 wherein the dyestuffs are selected from the group consisting of monoazo dyestuffs, disazo dyestuffs, and anthraquinone dyestuffs.

References Cited

UNITED STATES PATENTS

| 2,926,986 | 3/1960 | Petitcolas et al. | 8—85 |
| 2,030,222 | 2/1936 | Newton | 8—85 |
| 3,294,477 | 12/1966 | Taube et al. | |

NORMAN G. TORCHIN, Primary Examiner

J. E. CALLAGHAN, Assistant Examiner

U.S. Cl. X.R.

8—25

UNITED STATES PATENT OFFICE
CERTIFICATE OF CORRECTION

Patent No. 3,485,572     Dated December 23, 1969

Inventor(s) CARL TAUBE and KARL-HEINZ FREYTAG     page - 1

It is certified that error appears in the above-identified patent and that said Letters Patent are hereby corrected as shown below:

| Column | Line | Error |
|---|---|---|
| 4 | 20-25 | Formula |

"
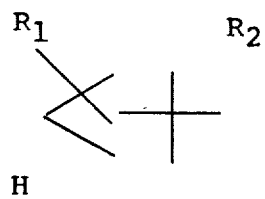
"

should read

--
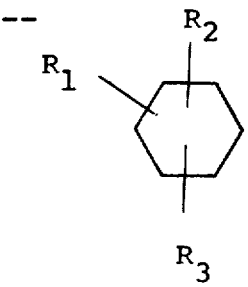
--

PO-1050
(5/69)

UNITED STATES PATENT OFFICE
CERTIFICATE OF CORRECTION

Patent No. 3,485,572      Dated December 23, 1969

Inventor(s) CARL TAUBE and KARL-HEINZ FREYTAG    PAGE - 2

It is certified that error appears in the above-identified patent and that said Letters Patent are hereby corrected as shown below:

| Column | Line | Error |
|---|---|---|
| 5 | 50 | "nucleus, 1-phenyl-5-" should read -- nucleus, e.g. by the substituents mentioned on Pages 5/6 1-phenyl-5- --. |
| 5 | 57 | "CCOH" should read --COOH--. |
| 7 | 60 formula | 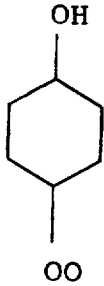 should read  |
| 9 | 5-10 Formula | 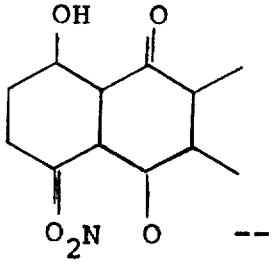 -- should read 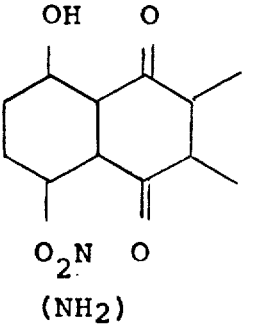 |

PO-1050
(5/69)

UNITED STATES PATENT OFFICE
CERTIFICATE OF CORRECTION

Patent No. 3,485,572   Dated December 23, 1969

Inventor(s) CARL TAUBE and KARL-HEINZ FREYTAG   PAGE- 3

It is certified that error appears in the above-identified patent and that said Letters Patent are hereby corrected as shown below:

| Column | Line | Error |
|--------|------|-------|
| 12 | Example 1 14-15 | "Ammonium chloride 400" should read -- ammonium chloride 40 --; --Crystal gum thickening 400 -- should be inserted after "Ammonium chloride". |
| 14 | 65 | "NH $CH_2$-$CH_2$-COOH" should read -- NH-$CH_2$-$CH_2$-COOH--. |

SIGNED AND SEALED
SEP 22 1970

(SEAL)
Attest:

Edward M. Fletcher, Jr.
Attesting Officer

WILLIAM E. SCHUYLER, JR.
Commissioner of Patents